United States Patent
Xu et al.

(10) Patent No.: US 7,103,117 B2
(45) Date of Patent: Sep. 5, 2006

(54) REDUCED-COMPLEXITY MULTIPATH INTERFERENCE CANCELLATION

(75) Inventors: Chang Qing Xu, Singapore (SG); Ju Yan Pan, Singapore (SG); Hiroshi Katsuragawa, Singapore (SG)

(73) Assignee: Oki Techno Centre (Singapore) Pte Ltd, Singapore (SG)

( * ) Notice: Subject to any disclaimer, the term of this patent is extended or adjusted under 35 U.S.C. 154(b) by 776 days.

(21) Appl. No.: 10/195,500

(22) Filed: Jul. 16, 2002

(65) Prior Publication Data

US 2003/0174794 A1 Sep. 18, 2003

(30) Foreign Application Priority Data

Mar. 12, 2002 (SG) ............... 200201414-0

(51) Int. Cl.
*H03D 1/04* (2006.01)

(52) U.S. Cl. .............. 375/346; 375/316; 455/296

(58) Field of Classification Search ........ 375/346, 375/148, 144, 214, 347, 316; 455/423, 133, 455/296; 370/335
See application file for complete search history.

(56) References Cited

U.S. PATENT DOCUMENTS

| | | | |
|---|---|---|---|
| 6,034,986 A * | 3/2000 | Yellin ................ | 375/148 |
| 6,192,067 B1 * | 2/2001 | Toda et al. .......... | 375/144 |
| 6,223,031 B1 * | 4/2001 | Naslund ............. | 455/423 |
| 6,496,494 B1 * | 12/2002 | Perrin et al. ........ | 370/335 |
| 6,625,201 B1 * | 9/2003 | Stirling-Gallacher .. | 375/144 |
| 6,804,312 B1 * | 10/2004 | Win et al. .......... | 375/347 |
| 2002/0037028 A1 * | 3/2002 | Baltersee et al. .... | 375/148 |
| 2002/0039383 A1 * | 4/2002 | Zhu et al. .......... | 375/214 |
| 2002/0172265 A1 * | 11/2002 | Kenney .............. | 375/148 |
| 2003/0114125 A1 * | 6/2003 | Sourour et al. ...... | 455/133 |

FOREIGN PATENT DOCUMENTS

EP 0 994 570 A1 4/2000

OTHER PUBLICATIONS

NTT DoCoMo; "Multipath Interference Canceller (MPIC) for HSDPA and Effect of 64QAM Data Modulation", Tdoc R1-01-0102, 3GPP TSG RAN1 Meeting 18, Boston, U.S.A., Jan. 2001, pp. 1-5.
Rong Hu et al., "Multipath Interference Cancellation and Modified RAKE Reveiver", Vehicular Technology Conference, 2001, VTC 2001 Spring, IEEE VTS 53rd, vol. 2, 2001, pp. 1508-1512.
Jens Baltersee et al., "A Novel Multipath Interference Cancellation Scheme for RAKE Channel Estimation", Vehicular Technology Conference, 2001, VTC 2001 Spring, IEEE VTS 53rd, vol. 2, 2001, pp. 1493-1497.
3GPP TR 25.848 v4.0.0, "Physical Layer Aspects ofUTRA High Speed Downlink Packet Access", pp. 1-89.

* cited by examiner

*Primary Examiner*—Mohammed Ghayour
*Assistant Examiner*—Leila Malek
(74) *Attorney, Agent, or Firm*—VENABLE LLP; Michael A. Sartori

(57) ABSTRACT

Multipath interference in a received wireless signal is cancelled by generating an estimated duplicate of the interference and subtracting it from the received signal. The interference duplication is performed in a truncated manner, based on a determination of which multipath signals are present, so as to reduce the complexity and processing requirement of the interference duplication. In particular, the present invention proposed that the truncation is based on a determination of which multipath signals are present, and the properties of those signals. In a first case, the truncation is that only interference between selected pairs of paths are cancelled in MPIC. In a second case, for given pairs of paths cancellation is only performed for a subset of the chips in which the corresponding two paths can cause interference.

14 Claims, 3 Drawing Sheets

REDUCED-COMPLEXITY MULTIPATH INTERFERENCE CANCELLATION

FIELD OF THE INVENTION

The present invention relates to methods and apparatus for cancelling multipath interference of wireless signals.

BACKGROUND OF THE INVENTION

Recently, high order modulation schemes, for example, 16QAM, 64QAM or even 256QAM, have been introduced to achieve high data rate wireless communications. In an actual propagation channel, multipath interference (MPI) caused by multipath fading may severely degrade the performance of wireless communications systems with high order modulations.

Multipath interference cancellation (MPIC) techniques have been proposed as a possible solution to mitigate severe multipath interference. The basic concept of MPIC is to duplicate the interference and remove the interference replica from the received signal. FIG. 1 shows schematically the general structure of a MPIC device.

The MPIC includes a feedback loop including an interference removal unit 10, a demodulator 20 and an interference duplication unit 30. A received signal subject to multipath interference is received from the left of FIG. 1, and an estimate of that signal without multipath interference is output to the right of FIG. 1.

Generally, the MPIC consists of two steps: firstly, based on the output of the demodulator 20 and channel estimates from a channel estimation unit (not shown), the interference duplication unit 30 estimates interference contributed by different paths; secondly, the interference removal unit 10 subtracts the estimated interference from the received signal [1], [2], [3].

Every path will cause interference to each other path. Assuming a system which can resolve m multipath signals, in total (m, 2) interference items should be taken into consideration. Here (m, 2) represents the number of ways of taking 2 items from m items. The calculation of each interference item is almost identical; therefore, the complexity of MPIC is proportional to the number of interference items.

The complexity of MPIC is quite high. For code division multiple access (CDMA) systems, the complexity of MPIC is at least 3 times larger than that of a conventional RAKE receiver [4].

SUMMARY OF THE INVENTION

The present invention seeks to provide new and useful methods and apparatus for attempting cancellation of multipath interference.

In its most general terms, the present invention proposes that MPIC is performed by a scheme as illustrated in FIG. 1, but in which the interference duplication is performed in a truncated manner so as to reduce the complexity and processing requirement of the interference duplication. In particular, the present invention proposed that the truncation is based on a determination of which multipath signals are present, and the properties of those signals.

In a first aspect of the invention, the truncation is that only a subset of the total number of interference items are cancelled in MPIC. These interference items are selected as the ones which are expected to give the greatest contribution to the multipath interference.

Specifically, the first aspect of the invention can be expressed as a method of reducing multipath interference in a received wireless signal which contains components transmitted along multiple paths, the method including:
  determining characteristics of the paths;
  using the determined characteristics to select, from among all pairs of paths, a subset of pairs of the paths;
  for each of the selected pairs of paths, generating an estimate of the interference between those pairs; and
  subtracting the interference estimates from the received signal.

Alternatively, the first aspect of the invention can be expressed as a wireless receiver for receiving a wireless signal which contains components transmitted along multiple paths, the receiver including:
  an analysis unit for determining characteristics of the paths;
  a selector unit for using the determined characteristics to select, from among all pairs of paths, a subset of pairs of the paths;
  an estimator unit which, for each of the selected pairs of paths, generates an estimate of the interference between those pairs; and
  a subtraction unit for subtracting the interference estimates from the received signal.

Preferably the characteristics of the paths comprise, or consist of, their path amplitudes, and interference items are selected based on these path amplitudes. Two fundamental facts motivate this. Firstly, the path amplitudes of the multipath signals typically fall off exponentially with the delay. In other words, the first path usually has the largest amplitude and the following paths have much smaller amplitudes. Secondly, the interference strength of interference items is proportional to the corresponding path amplitudes. Therefore, we can choose the strongest interference items among the total (m, 2) interference items and remove these interference. Depending on the number of interference items selected, the complexity of MPIC can be reduced and under control.

Note that the first aspect of the invention is applicable to any system employing multipath interference cancellation. In the examples given later, it is applied to spread-spectrum wireless signals, but a skilled reader will readily be able to apply it to other formats. Within the context of spread-spectrum techniques, it is applicable to any spread-spectrum format, such as both direct sequence and frequency hopping spread spectrum techniques.

In a second aspect of the invention, which is freely combinable with the first aspect in the case that the wireless signal is a spread-spectrum signal employing a pseudo-random code (based on chips), the truncation is that for given interference items, cancellation is only performed for a subset of the chips in which the corresponding two paths can cause interference.

Specifically, the second aspect of the invention can be expressed as a method of reducing multipath interference in a received wireless signal which contains components transmitted along multiple paths, the wireless signal being a spread spectrum signal employing a pseudo-random code, the method including:
  determining characteristics of the paths;
  for at least one pair of paths, using the determined characteristics to select at least one portion of the signal duration, and generating an estimate of the interference between the paths over the or each selected portion of the signal duration; and subtracting the estimated interference from the received signal.

Alternatively, the second aspect of the invention can be expressed as a receiver for receiving a spread-spectrum wireless signal employing a pseudo-random code and which contains components transmitted along multiple paths, the receiver including:

an analysis unit for determining characteristics of the paths;

a selector unit which, for at least one pair of paths, uses the determined characteristics to select at least one portion of the signal duration, an estimation unit for generating an estimate of the interference between the paths over the or each selected portion of the signal duration; and a subtraction unit for subtracting the estimated interference from the received signal.

As for how the portion may be selected, a thorough investigation of multipath interference reveals that each interference item consists of two portions: the interference occurred from chips 1 to chips Txy and the interference occurred from chips (Txy+1) to chips SF. Here Txy is the relative delay in chips between path X and path Y. SF is the spreading factor. Therefore, we propose separating the interference into two types. To simplify the description, the interference occurred from chips 1 to chips Txy is named by interference F (first portion) while the interference occurred from chips (Txy+1) to chips SF is called interference S (second portion), and the portion of the interference which is used for MPIC is preferably the one of these two portions which is higher.

Furthermore, the invention can be expressed as a receiver including a multipath cancellation unit according to either (or both) of the first and second aspects of the invention. The invention can further be expressed as a communication system including such a receiver

BRIEF DESCRIPTION OF THE FIGURES

Embodiments if the invention will now be described for the sake of example only with reference to the following figures in which.

DETAILED DESCRIPTION OF THE EMBODIMENTS

Figure 1:
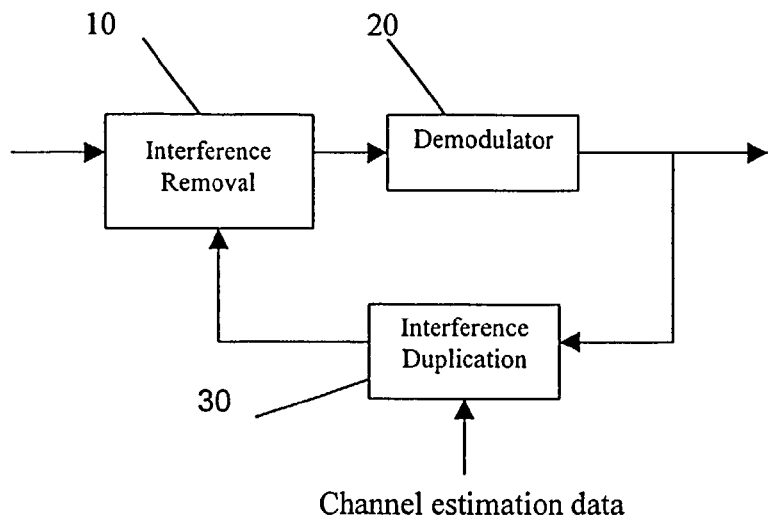
FIG. 1 shows schematically the structure of a MPIC device.

Three embodiments of the invention will now be described. All have the overall structure shown in FIG. 1, but the interference duplication performed by the unit 30 differs as described below.

In the first embodiment, we consider a wideband code division multiple access (WCDMA) communication system using 16QAM. MPIC is employed to increase the throughput (peak data rate). Assuming a 4 path channel environment, there are in total 6 interference items.

To reduce the complexity of MPIC, only the strongest interference items are selected and removed by MPIC. The selection scheme is quite simple: with the help of channel estimation, the path amplitudes can be obtained. Based on the estimated path amplitudes, the strength of each interference item can be evaluated without computing the interference. This is because that the strength of interference is proportional to the power sum of the corresponding paths. For example, (Px+Py) provides a good approximation of the interference strength between path X and path Y. Here Px and Py are the powers of path X and path Y, respectively. After getting the strength approximation of all interference items, we preferably select the proper number of interference items to be cancelled based on the performance requirement as well as the hardware cost limitations.

We now present simulation results in terms of throughput. Table 1 shows the simulation parameters.

TABLE 1

| Simulation Parameters | |
|---|---|
| Parameter | Value |
| Carrier Frequency | 2 GHz |
| Chip Rate | 3.84 M |
| Propagation Conditions | Rayleigh Fading with speed of 3 km/h |
| Number of Multipath Signals | 4 |
| Power of Multipath Signals | 0. −3, −6, −9 (dB) |
| Delay of Multipath Signals | 0, 1, 2, 3 (Chip) |
| Data Combining for Multipath | RAKE Combining |
| Number of Stages for MPIC | 2 |
| Frame Length | 2 ms |
| Spreading Factor | 16 |
| Number of Multicodes | 5 |
| Ior/Ioc | Variable |
| Modulations | 16QAM with coding rate of ½ and ¾ |
| Channel Coding | Turbo Code (PCCC), ⅓ |
| Channel Estimation | Ideal |
| Max no. of Iterations for Turbo Coder | 6 |
| Metric for Turbo Coder | Max-log MAP |
| Input to Turbo Decoder | Soft |
| HARQ | Chase Combining |
| Max no. of Transmission Attempt | 4 |

Figure 2:
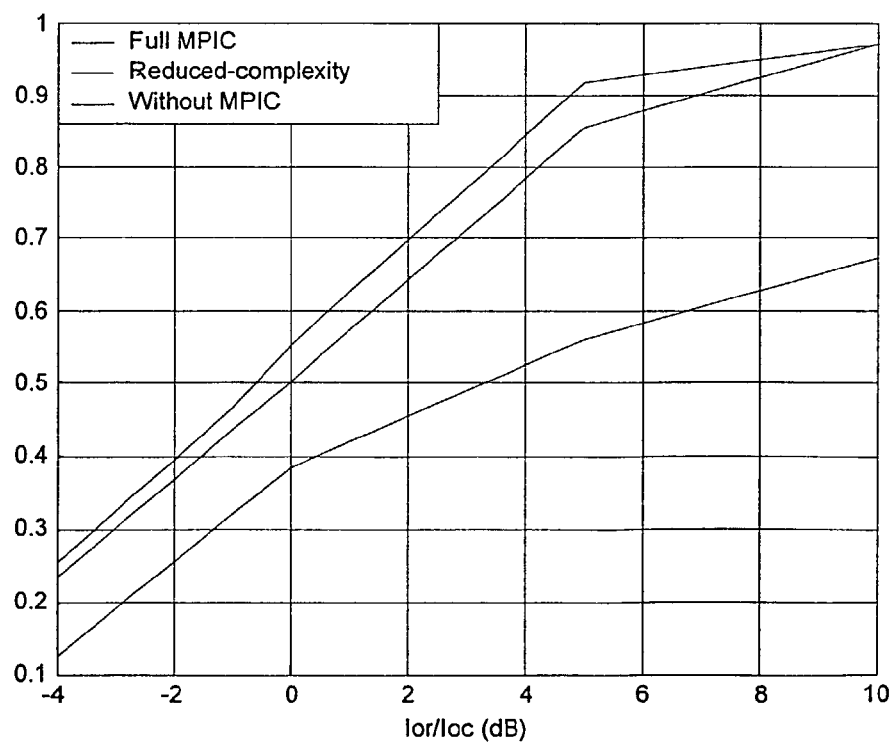
FIG. 2 shows throughput performance of a first embodiment of the invention for 16QAM signals with a coding rate of ½.
Figure 3:
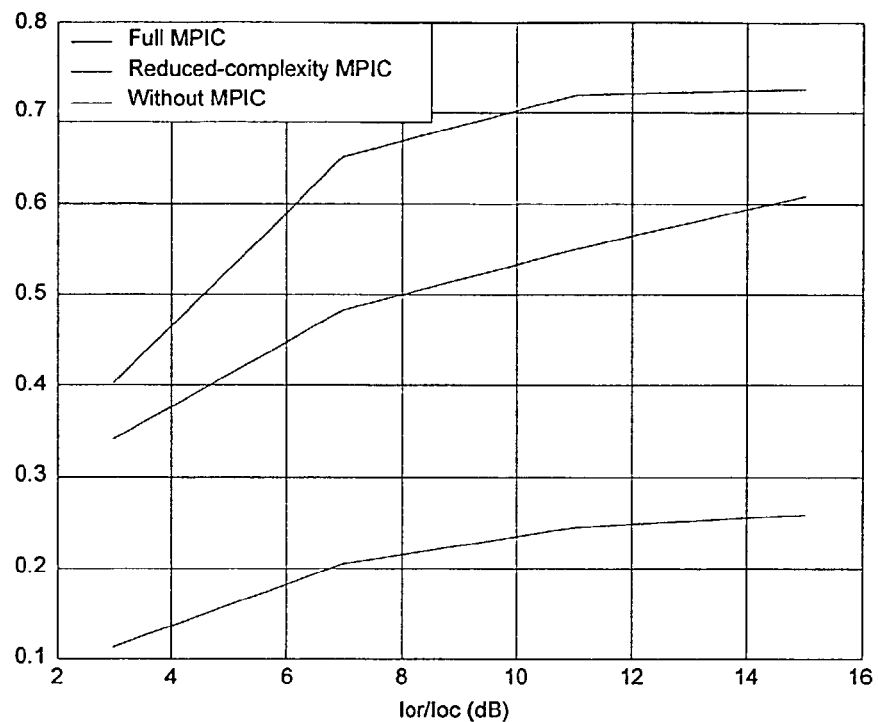
FIG. 3 shows throughput performance of the first embodiment for 16QAM signals with a coding rate of ¾.

FIG. 2 and FIG. 3 respectively show the throughput performance for 16QAM ½ and 16QAM ¾ with 3 interference items cancelled by MPIC. This line is marked on FIGS. 2 and 3 as "reduced complexity MPIC". The results with all 6 interference items cancelled by MPIC ("Full MPIC") and results without MPIC are also plotted as references. Note that in each case the throughput is normalised with the maximum possible throughput.

Observing FIG. 2 and FIG. 3, we find that MPIC can improve the throughput performance significantly. Compared with full MPIC, reduced-complexity MPIC has some performance degradation. For 16QAM ½, the degradation is very slight (less than 10%). For 16QAM ¾, the largest degradation is about 25%. However, the complexity of reduced-complexity MPIC is 50% less than that of full MPIC. Thus, reduced-complexity MPIC provides a good compromise between performance and hardware complexity.

We now turn to a second aspect of the present invention. As in the first embodiment, only the strongest interference is selected and cancelled by MPIC. However, the selection criterion is different from that of the first embodiment. As discussed above, the stronger interference between interference F and interference S is selected for each interference item. The selection can be easily done by comparing the value of Txy and the value of (SF−Txy). This is because the strengths of interference F and of interference S are proportional to the values of Txy and (SF−Txy), respectively.

A simulation has been done for the second embodiment. The simulation conditions are same as those given in Table 1.

Figure 4:
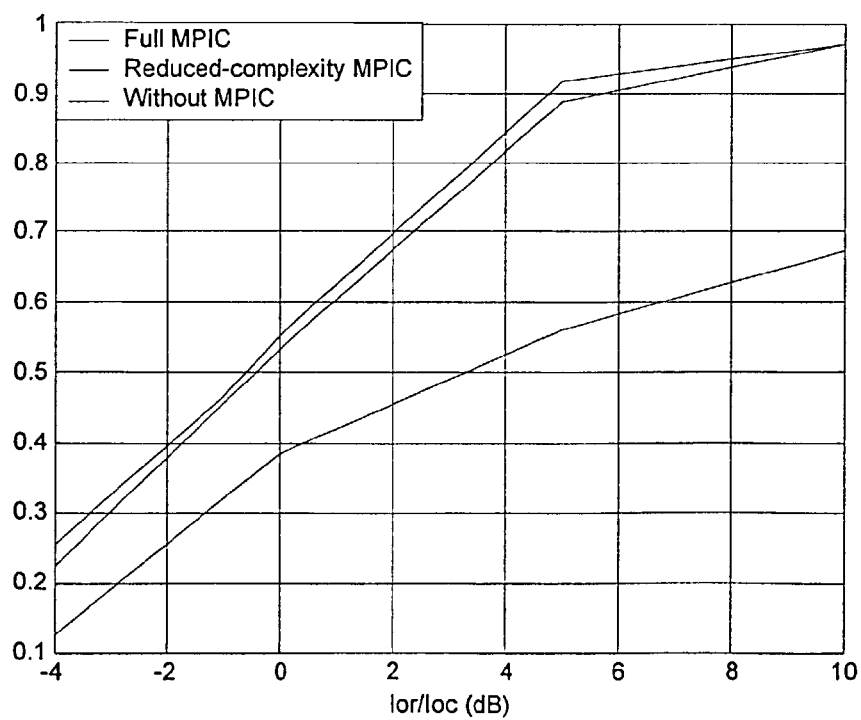
FIG. 4 shows throughput performance of a second embodiment of the invention for 16QAM signals with a coding rate of ½.
Figure 5:
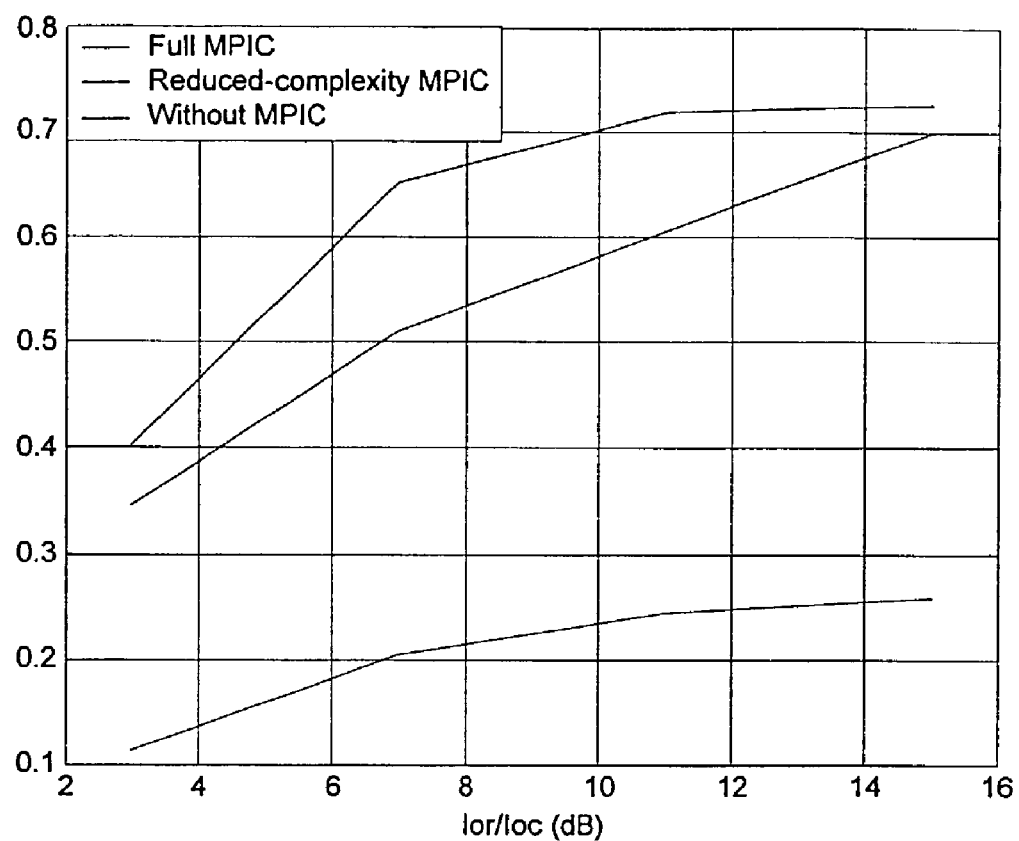
FIG. 5 shows throughput performance of the second embodiment for QAM signals with a coding rate of ¾.

FIG. 4 and FIG. 5 respectively show the throughput performance for 16QAM ½ and 16QAM ¾ with interference S of every interference item cancelled by MPIC. In the example given in Table 1, SF−Txy happens to be always higher than Txy for the multipaths shown, but in real situations the relative delay between the paths is random. The complexity of MPIC is reduced about 50%.

It can be observed that the performance degradation of the reduced-complexity MPIC is acceptable. For 16QAM ½, the degradation is very slight (less than 5%). For 16QAM ¾, the largest degradation is about 20%. The reduced-complexity MPIC thus provides a good trade-off between performance and hardware complexity.

We now turn to a third embodiment of the invention, which is a combination of the methods used in the previous two embodiments. In other words, the selection of interference to be cancelled is divided into two steps: firstly, choose the strongest interference items according the path amplitudes; secondly, choose the stronger one between interference F and interference S for the interference items selected in step 1. With this combination, the complexity of MPIC can be reduced further.

Thus the third embodiment of the invention, is common with the first and second embodiments, makes it possible to reduce the hardware cost of MPIC, in comparison to known MPIC methods.

Although the invention has been described here with reference to only three embodiments, the invention is not limited in this respect and many variations are possible within the scope of the invention, as will be clear to a skilled reader.

In particular, although the devices for performing MPIC are described here as including several "units" it is to be understood that these units need not be physically separate. Rather, they may be sections of software running on any number of physical processors.

Reference:

The following documents are incorporated herein by reference:
[1] NTT DoCoMo, "Multipath Interference Canceller (MPIC) for HSDPA and Effect of 64QAM Data Modulation", Tdoc R1-01-0102, 3GPP TSG RAN1 Meeting 18, Boston, U.S.A, January 2001
[2] Rong Hu; Aiping Huang; Hongyu Wang; Weikang Gu, "Multipath interference cancellation and modified rake receiver", Vehicular Technology Conference, 2001. VTC 2001 Spring. IEEE VTS 53rd, Volume: 2, 2001, pp. 1508–1512
[3] Baltersee, J.; Fock, G.; Schulz-Rittich, P., "A novel multipath interference cancellation scheme for rake channel estimation," Vehicular Technology Conference, 2001. VTC 2001 Spring. IEEE VTS 53rd, Volume: 2, 2001, pp.1493–1497
[4] 3GPP TR 25.848 v4.0.0: Physical Layer Aspects of UTRA High Speed Downlink Packet Access.

The invention claimed is:

1. A method of reducing multipath interference in a received wireless signal which contains components transmitted along multipaths, the method including:

determining characteristics of the paths;
using the determined characteristics to select, from among all pairs of paths, a subset of pairs of the paths;
for each of the selected pairs of paths, generating an estimate of the interference between those pairs; and
subtracting the interference estimates from the received signal.

2. A method according to claim 1 in which the pairs of paths are selected based on a measure of the contribution of the interference between those pairs of paths to the total multipath interference in the received signal.

3. A method according to claim 2 in which the subset of paths is selected as the pairs of paths which have maximal power ratio sum.

4. A method according to claim 1 in which the number of pairs in the subset is selected based on operating requirements and the determined characteristics.

5. A method according to claim 1 further including, for at least one of said selected pairs of paths, using the determined characteristics to select at least one portion of the signal duration, said step of generating the estimate of the interference between that pair of paths being carried out by generating an estimate of the interference between that pair of paths over the or each selected portion of the signal duration.

6. A wireless receiver for receiving a wireless signal which contains components transmitted along multiple paths, the receiver including:

an analysis unit for determining characteristics of the paths;
a selector unit for using the determined characteristics to select, from among all pairs of paths, a subset of pairs of the paths;
an estimator unit which, for each of the selected pairs of paths, generates an estimate of the interference between those pairs; and
a subtraction unit for subtracting the interference estimates from the received signal.

7. A receiver according to claim 6 in which the selector unit is operative to select the pairs of paths based on a measure of the contribution of the interference between those pairs of paths to the total multipath interference in the received signal.

8. A receiver according to claim 7 in which the subset of paths is selected as the pairs of paths which have the maximal power ratio product.

9. A receiver according to claim 7 in which the selector unit is operative to select a number of pairs of paths which depends upon on operating requirements and the determined characteristics.

10. A receiver according to claim 6 in which the selector unit is operative, for at least one of said selected pairs of paths, to use the determined characteristics to select at least one portion of the signal duration, and generate said estimate of the interference between that pair of paths as an estimate of the interference between that pair of paths over the or each selected portion of the signal duration.

11. A method of reducing multipath interference in a received wireless signal which contains components transmitted along multipaths, the wireless signal being a spread spectrum signal employing a pseudo-random code, the method including:

determining characteristics of the paths;
for at least one pair of paths, using the determined characteristics to select at least one portion of the signal duration, and generating an estimate of the interference between the paths over the selected at least one portion of the signal duration; and subtracting the estimated interference from the received signal.

12. A method according to claim 11 in which the selected portion of the signal duration is a selected one of a first portion of the signal and the remainder of the signal.

13. A receiver for receiving a spread-spectrum wireless signal employing a pseudo-random code and which contains components transmitted along multiple paths, the receiver including:

an analysis unit for determining characteristics of the paths;

a selector unit which, for at least one pair of paths, uses the determined characteristics to select at least one portion of the signal duration;

an estimation unit for generating an estimate of the interference between the paths over the selected at least one portion of the signal duration; and a subtraction unit for subtracting the estimated interference from the received signal.

14. A receiver according to claim 13 in which the selected portion of the signal duration is a selected one of a first portion of a the signal and the remainder of the signal.

* * * * *